Patented Jan. 9, 1923.

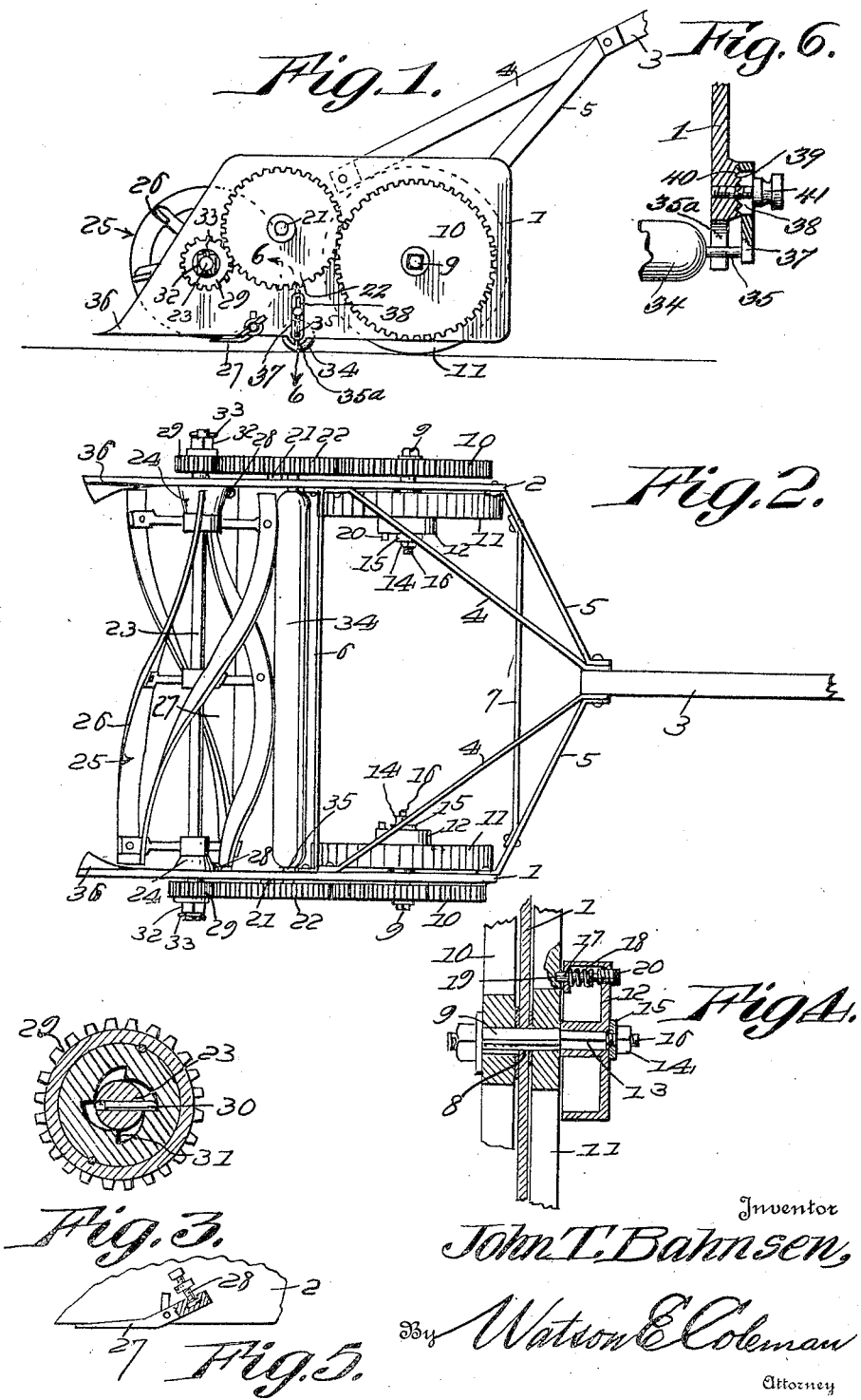

1,441,720

UNITED STATES PATENT OFFICE.

JOHN T. BAHNSEN, OF DODGE CENTER, MINNESOTA.

LAWN MOWER.

Application filed March 2, 1921. Serial No. 448,953.

*To all whom it may concern:*

Be it known that I, JOHN T. BAHNSEN, a citizen of the United States, residing at Dodge Center, in the county of Dodge and State of Minnesota, have invented certain new and useful Improvements in Lawn Mowers, of which the following is a specification, reference being had to the accompanying drawings.

It is the purpose of the present invention to provide a mower, wherein the supporting drive wheels are independently rotatable, permitting the machine to make short turns without in any way affecting the operation of the cutting mechanism of the mower.

Another purpose consists in the provision of means for detachably locking or latching each of the drive wheels to its respective stub shaft which carries a drive gear, so as to insure positive driving action for the rotating cutting reel, said means being operable so as to permit the drive wheel to rotate freely, without operating the cutting reel.

Still another purpose is the provision of means, whereby the reel with its cutting knives may rotate freely.

A further purpose is the provision of a grass guard or guide acting to push the grass under the revolving knives.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in side elevation, of the improved lawn mower constructed in accordance with the invention.

Figure 2 is a plan view of the same.

Figure 3 is a detail view of one end of the revolving reel cutter shaft, showing the means whereby the gear is connected thereto, to permit the revolving reel cutter to freely rotate.

Figure 4 is a detail view through one of the drive wheels of the mower, showing the cap for fastening the drive wheel to the stub shaft, in order that the drive wheels may rotate with or independently of the stub shafts.

Figure 5 is a detail view of the cutter bar 27, showing the means for adjusting the same.

Figure 6 is a sectional view on line 6—6 of Figure 1 showing the mounting of the roller 34.

Referring to the drawings, 1 and 2 designate the opposite sides of the frame of the lawn mower, and 3 denotes the handle, which is reinforced relatively to the sides 1 and 2 by the braces or connectors 4 and 5. The sides are additionally relatively reinforced by the brace 6, and the braces 5 are reinforced by the brace 7, so as to insure a structure with sufficient rigidity to support the lawn mower mechanism.

Journaled in bearings 8 and the sides 1 and 2 are stub shafts 9, on the outer ends of which gears 10 are mounted to rotate with the shafts.

Supporting drive wheels 11 are mounted to rotate freely on the stub shafts 9, but in order to impart power to the gears, caps 12 are carried by the stub shafts, and which have means for detachably latching the caps to any one of the spokes of the drive wheels. The stub shafts 9 have reduced rectangular parts 13, which are engaged by the caps, there being nuts and washers 14 and 15 on the threaded extension 16 of the rectangular extensions 13, for the purpose of holding the caps in position. The caps carry tension latch pins 17, the springs 18 of which act to hold the pins 17 normally out of engagement with the depressions 19 of certain of the spokes, which permit the supporting drive wheels to rotate freely without transmitting power to the lawn mower cutting mechanism. However, the caps carry adjusting thumb screws 20 to be operated to depress the spring tension pins 17 causing them to engage the depressions 19, therefore as the caps are fixed to the stub shafts 9 and the drive wheels are loose upon the stub shafts, it is obvious that the supporting drive wheels will impart movement to the gears 10, which will transmit motion to the cutting mechanism.

Rotatable upon stub shafts 21 of the outer faces of the sides 1 and 2 are gears 22, which mesh with the gears 10.

A shaft 23 is mounted in bearings 24 of the sides 1 and 2, and carried by the shaft 23 is a conventional form of revolving reel cutter 25, the cutting blades of which are disposed in spiral directions, so that as the reel rotates the cutting edges of the blades 26 may have a shearing cooperative action with the stationary cutting blade 27. This cutting blade 27 is connected to the opposite sides 1 and 2 of the frame, and is adjustable relatively to the revoluble cutter by means of the swivelled set screw 28.

Carried by the ends of the shaft 23 are gears or pinions 29, which mesh with the gears 22, so that through the medium of the gears 10 and 22, motion may be imparted to the shaft 23 and the revoluble cutter.

The pinions 29 are connected to the shaft 23 by means of the automatic clutch pins or keys 30, which are operable transversely of the ends of the shaft 23. These clutch pins or keys cooperate with ratchet teeth 31 on the interior of the hubs of the gears 29. The gears 29 are prevented from moving outwardly axially on the shaft 23 by means of the nuts 32 and cotter pins 33. The pins 30 at the ends of the shaft 23 are designed to be engaged by any one of the ratchet teeth 31 during the rotation of the gear 29, so as to impart movement to the reel 25. However on a retrograde movement of the lawn mower, the gears 29 are reversed in their rotary movements, and in this case the pins 30 reciprocate freely, as the ratchet teeth pass over the ends of the pins, and in this way the reel remains idle on a retrograde movement of the lawn mower.

A supporting roller 34 has its stub shafts or pintles 35 mounted in guide slots 35ª of the opposite sides 1 and 2 of the mower. These pintles or stub shafts 35 are journaled in bearings 37. The bearings 37 consist of plates having slots 38 and provided with teeth 39, which engage teeth 40 on the outer faces of the side pieces 1 and 2 of the lawn mower. Set screws 41 pass through the slots 38 and are threaded into the side pieces 1 and 2 of the frame of the lawn mower. Obviously by loosening the set screws 41, the bearings or plates 37 may be adjusted vertically on the outer faces of both of the side pieces 1 and 2, whereby the roller 34 may be raised or lowered according to the length, which it is desired to cut the grass. The supporting roller 34 cooperates with the drive wheels to evenly and properly balance the lawn mower.

Carried by the forward portions of the sides 1 and 2 of the lawn mower are suitable guards or guides 36 to deflect the grass under the revolving knives.

The invention having been set forth, what is claimed as being useful is:

1. In a lawn mower, a frame, stationary and revoluble cutters on the frame, stub shafts mounted in bearings of the frame and being operatively connected with the revoluble cutter, supporting drive wheels loose on the stub shafts rotatable independently of each other, and a cap having means for detachably coupling the drive wheel to each stub shaft.

2. In a lawn mower, a frame, stationary and revoluble cutters on the frame, stub shafts mounted in bearings of the frame and being operatively connected with the revoluble cutter, supporting drive wheels loose on the stub shafts rotatable independently of each other, and a cap having means for detachably coupling the drive wheel to each stub shaft, and means to permit the revoluble cutter to rotate and remain idle on a retrograde movement of the lawn mower.

3. In a lawn mower, a frame, stationary and revoluble cutters on the frame, stub shafts mounted in bearings of the frame and being operatively connected with the revoluble cutter, supporting drive wheels loose on the stub shafts rotatable independently of each other, and a cap having means for detachably coupling each drive wheel to its respective stub shaft, and guards carried by the sides of the frame to deflect the grass under the revoluble cutter.

In testimony whereof I hereunto affix my signature.

JOHN T. BAHNSEN.